(12) United States Patent
Ito et al.

(10) Patent No.: US 8,923,443 B2
(45) Date of Patent: Dec. 30, 2014

(54) WIRELESS RECEIVER

(71) Applicant: Goyo Electronics Co., Ltd., Akita (JP)

(72) Inventors: Katsuhiko Ito, Akita (JP); Hiroki Honma, Akita (JP); Yoshimi Nitta, Akita (JP)

(73) Assignee: Goyo Electronics Co., Ltd., Akita (JP)

( * ) Notice: Subject to any disclaimer, the term of this patent is extended or adjusted under 35 U.S.C. 154(b) by 69 days.

(21) Appl. No.: 13/773,728

(22) Filed: Feb. 22, 2013

(65) Prior Publication Data
US 2013/0223569 A1    Aug. 29, 2013

(30) Foreign Application Priority Data
Feb. 23, 2012  (JP) .................................. 2012-037411

(51) Int. Cl.
*H04L 25/06*    (2006.01)

(52) U.S. Cl.
CPC ..................................... *H04L 25/06* (2013.01)
USPC ........................... 375/319; 375/317; 375/316

(58) Field of Classification Search
CPC .............. H04B 17/0037; H04B 17/004; H03F 3/45179; H04L 25/06
USPC ......................................... 375/319, 317, 316
See application file for complete search history.

(56) References Cited

U.S. PATENT DOCUMENTS

| | | | |
|---|---|---|---|
| 6,498,929 B1* | 12/2002 | Tsurumi et al. | 455/296 |
| 7,031,668 B2* | 4/2006 | Darabi et al. | 455/75 |
| 7,221,919 B2* | 5/2007 | Takagi | 455/253.2 |
| 7,493,098 B2* | 2/2009 | Yoshizaki et al. | 455/333 |
| 2002/0094788 A1* | 7/2002 | Hayashi et al. | 455/73 |
| 2003/0092416 A1* | 5/2003 | Tanaka et al. | 455/323 |
| 2004/0097212 A1* | 5/2004 | Matsumoto et al. | 455/296 |
| 2005/0282510 A1* | 12/2005 | Bang et al. | 455/190.1 |
| 2006/0068746 A1* | 3/2006 | Feng et al. | 455/323 |
| 2007/0085596 A1* | 4/2007 | Ito | 327/534 |
| 2009/0202022 A1* | 8/2009 | Kaczman et al. | 375/319 |
| 2013/0278316 A1* | 10/2013 | Lin et al. | 327/254 |

FOREIGN PATENT DOCUMENTS

JP    H10-13482    1/1998

* cited by examiner

*Primary Examiner* — Kenneth Lam
(74) *Attorney, Agent, or Firm* — Bacon & Thomas, PLLC

(57) ABSTRACT

A direct-conversion type wireless receiver includes a pair of mixers for frequency-converting a radio signal received from an antenna into a base band signal by local signals having different phases; a first amplification circuit for amplifying the base band signal up to a demodulation level; a second amplification circuit provided between the mixer and the first amplification circuit; and a variable current circuit including a multi-stage current mirror to add a current $2^n$ times as high as a reference current. The wireless receiver further includes a control unit configured to correct a DC offset of the mixer by allowing a current to flow into the second amplification circuit from the variable current circuit, based on an output of the first amplification circuit, and a capacitor connected between a gate and a source of a PchMOSFET which allows the reference current to flow therethrough.

6 Claims, 16 Drawing Sheets

FIG.6

| ADC CODE RANGE | OUTPUT OF SECOND COMPARATOR | OUTPUT OF THIRD COMPARATOR | OUTPUT OF EX-OR CIRCUIT |
|---|---|---|---|
| SECOND REFERENCE VOLTAGE CODE + CONVERGENCE RANGE SETTING VALUE < ADC CODE | 0 | 1 | 1 |
| SECOND REFERENCE VOLTAGE CODE − CONVERGENCE RANGE SETTING VALUE ≦ ADC CODE ≦ SECOND REFERENCE VOLTAGE CODE + CONVERGENCE RANGE SETTING VALUE | 0 | 0 | 0 |
| ADC CODE < SECOND REFERENCE VOLTAGE CODE − CONVERGENCE RANGE SETTING VALUE | 1 | 0 | 1 |

DC OFFSET CORRECTION CONVERGENCE RANGE

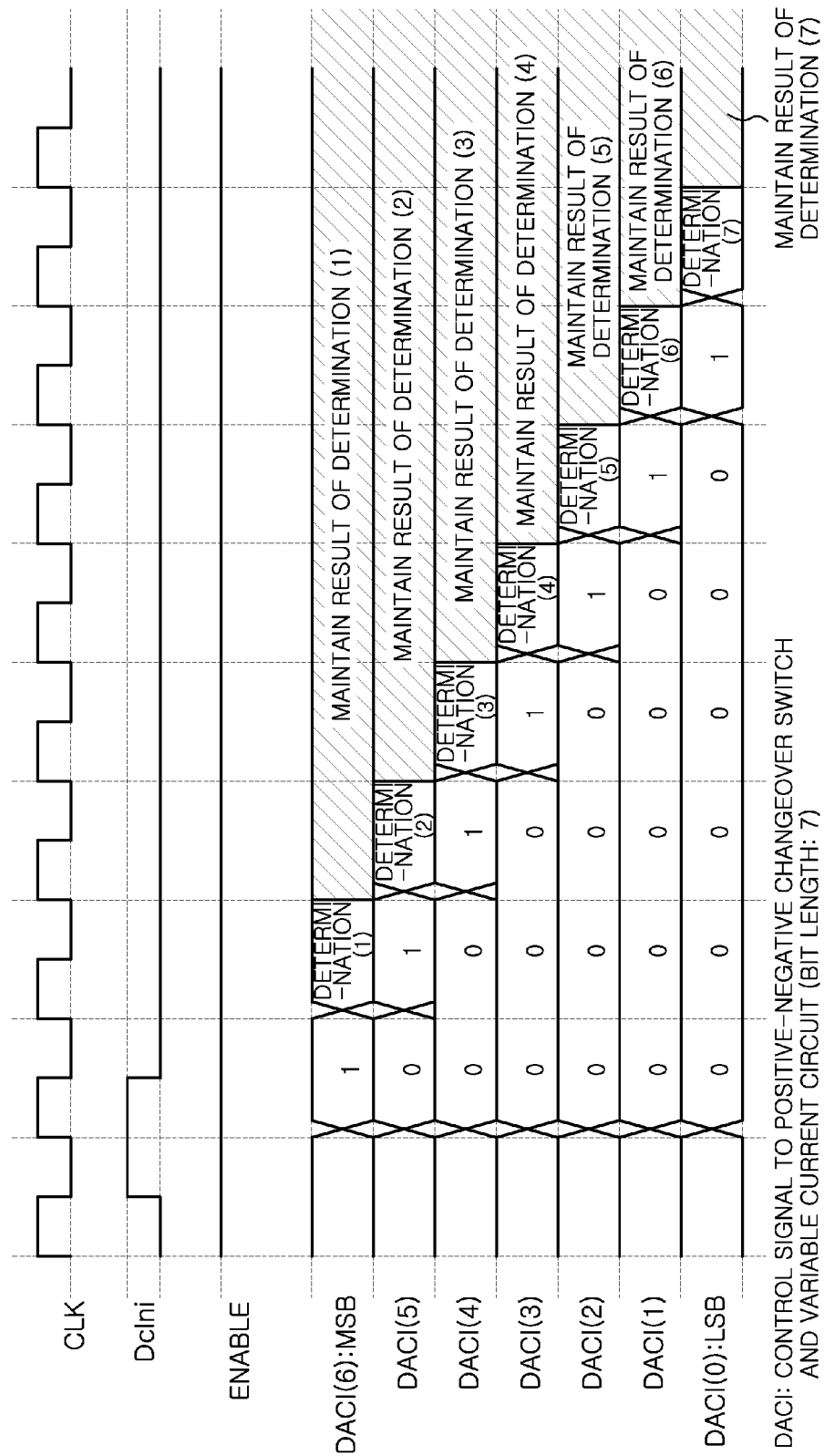

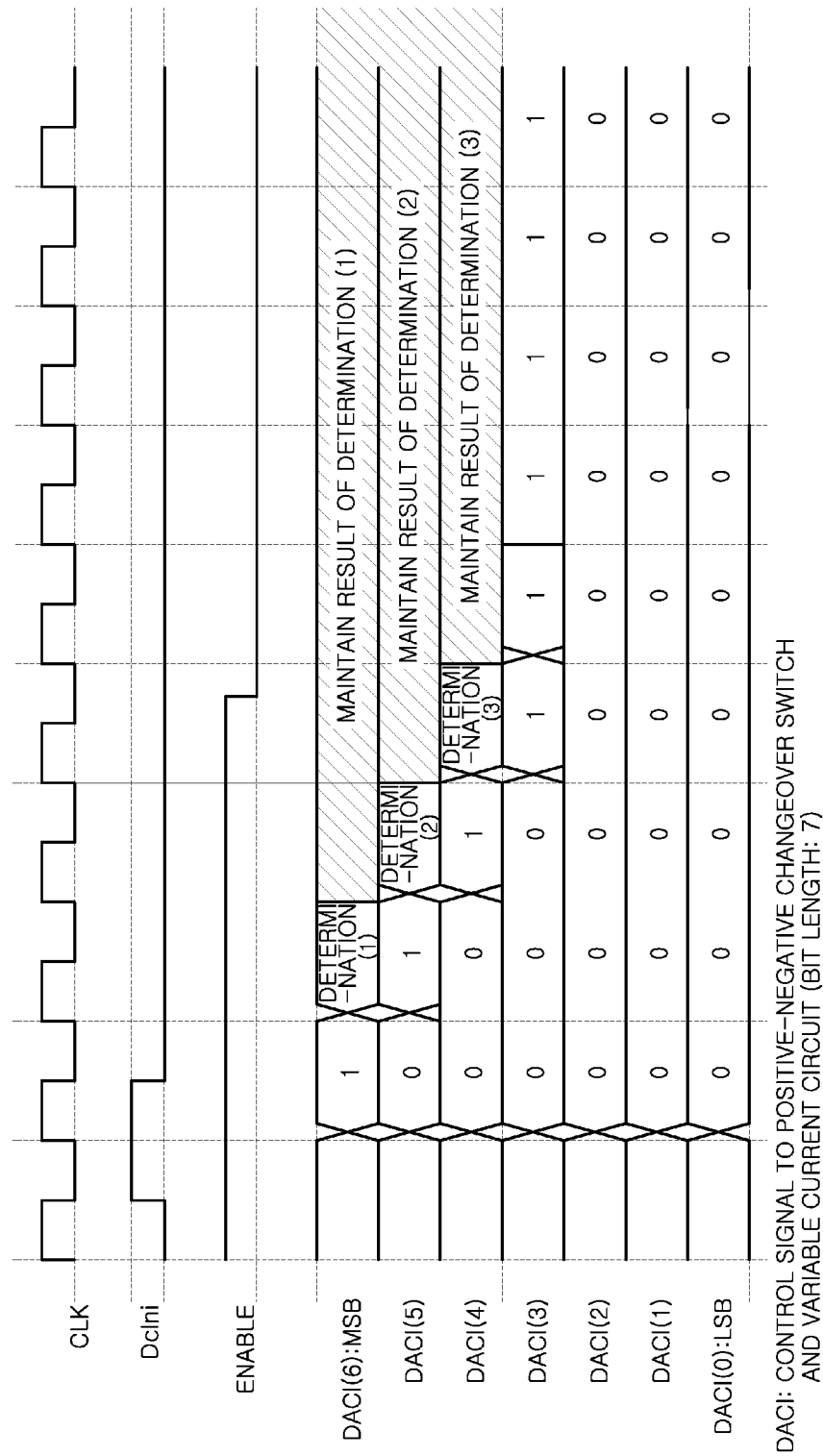

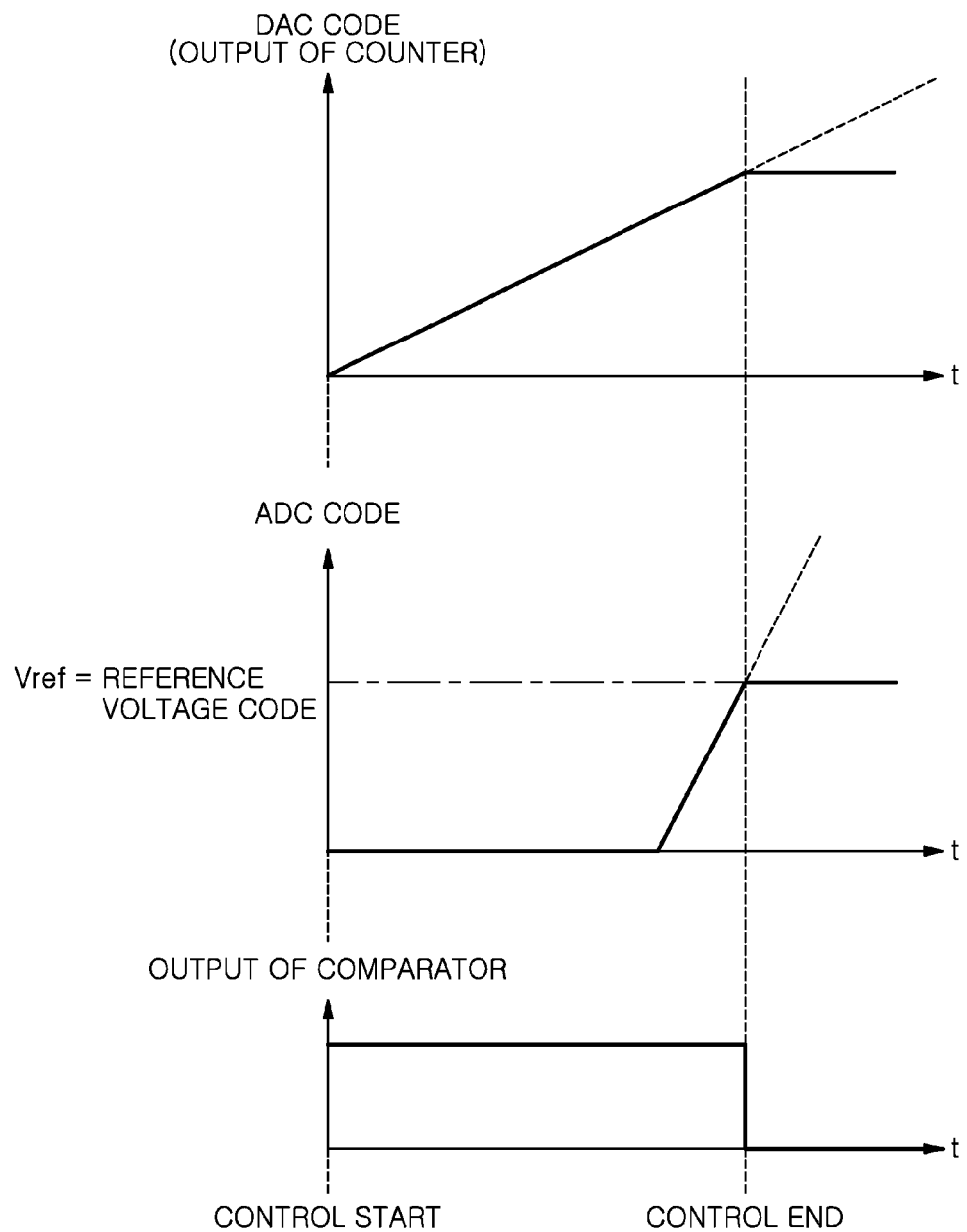

WIRELESS RECEIVER

FIELD OF THE INVENTION

The present invention relates to a direct-conversion type wireless receiver.

BACKGROUND OF THE INVENTION

In a conventional direct-conversion type wireless receiver (hereinafter, referred to as a DC type wireless receiver), in which a received signal is frequency-converted by a mixer into a base band signal that is a modulated wave and the base band signal is amplified to a required signal level for demodulation by a differential amplifier, an input signal obtained by inputting a local signal into the mixer by using a local oscillator leaks to the RF input port of the mixer, and the leakage signal is reflected back from an antenna or a low-noise amplifier to be re-inputted into the mixer. Accordingly, since the re-inputted signal is identical to the local signal, a self-mixing occurs to thereby generate a DC offset.

In the DC type wireless receiver, the DC level of an input signal inputted into a demodulation unit is amplified in proportion to the value of DC offset×Gain since IQ signal includes the DC offset. Accordingly, since the DC bias exceeds the power supply voltage, there is a problem in that a desired signal cannot be transmitted. For this reason, the DC offset is required to be corrected to a level such that no such problem is encountered even when the DC level is amplified in proportion to the value of the gain.

In order to correct the DC offset, Japanese Patent Application Publication H10-013482 discloses a technique for detecting and correcting the DC offset.

FIG. 10 shows a conventional direct-conversion receiver. This receiving circuit includes an antenna 1, a band pass filter 2, a low noise amplifier 3, mixers 4 and 5, a phase shifter 6, a local oscillator 7, DC offset correction circuits 40 and 41, low pass filters 18 and 19, variable gain amplifiers 20 and 21, an automatic gain control unit 22, and a demodulation unit 23.

A desired radio frequency of a received signal only passes through the band pass filter 2, and the received signal is amplified by the low noise amplifier 3 and then is inputted into the mixers 4 and 5. The received signal is frequency-converted to a base band signal by the mixer 4 (or 5) by using a local signal of the local oscillator 7. The base band signal is amplified by the differential amplifier 14 (or 15) provided in the next stage, and a reception channel frequency is selected through the low pass filter 18 (or 19). Thereafter, a gain of the signal is adjusted by the automatic gain control unit 22 and the variable gain amplifier 20 (or 21) depending on the received signal strength in order to secure a dynamic range performance. The signal is then inputted into the demodulation unit 23. Since DC offsets generated by the mixers 4 and 5 and the differential amplifiers 14 and 15 are added to the base band signals, and then inputted into the demodulation unit 23, the DC offset correction circuits 40 and 41 are provided to correct the DC offsets.

In the conventional case, the DC offset correction circuit 40 (or 41), which includes an AD converter 24 (or 25), a DA converter (hereinafter, referred to as DAC) 32 (or 33), an operational amplifier 34 (or 35), a comparator 28 (or 29), a reference voltage code 26 (or 27), and a counter control unit 30 (or 31), corrects the DC offset by changing an output voltage of the operational amplifier 34 (or 35).

If an output voltage of the positive side of the differential output of the mixer 4 (or 5) is Vp; an output voltage of the negative side of the differential output of the mixer 4 (or 5) is Vn; an output voltage of the signal component of the positive side is Vpdata; an output voltage of the DC component other than the signal component of the positive side (bias voltage+DC offset) is Vpdc; an output voltage of the signal component of the negative side is Vndada; and an output voltage of the DC component other than the signal component of the negative side is Vndc, Vp and Vn are expressed as the following equations:

Vp=Vpdata+Vpdc, and

Vn=Vndata+Vndc.

If an output voltage of the operational amplifier 34 (or 35) is V' and an output voltage of the differential amplifier 14 (or 15) is Vout, Vpdc becomes equal to Vndc when no DC offset is generated, and thus, the output voltage Vout is expressed as the following equation (a):

$$Vout = (R2(Vp - Vn)/R1) + V' \qquad (a)$$
$$= (R2(Vpdata - Vndata)/R1) + V'.$$

If the DC offset generated by the mixer 4 (or 5) is α (=Vpdc−Vndc), the output voltage Vout of the differential amplifier 14 (or 15) is expressed as the following equation (b):

$$Vout = (R2(Vpdata - Vndata + \alpha)/R1) + V' \qquad (b)$$
$$= (R2(Vpdata - Vndata)/R1) + R2 \cdot \alpha/R1 + V'.$$

Here, R2·α/R1 is the voltage generated by the DC offset. If a bias voltage after the differential amplifier 14 (or 15) is Vref, the DC offset is corrected by controlling V' so as to satisfy the following equation (c):

$$Vref = R2 \cdot \alpha/R1 + V' \qquad (c).$$

Correction of the DC offset is controlled when the mixer 4 (or 5) outputs only DC component output voltages Vpdc and Vndc, and the automatic gain control unit 22 controls the variable gain amplifier 20 (or 21) to be fixed to a maximum gain in order to efficiently use the resolution of the ADC 24 (or 25). Then, the counter control is started by using an initial signal (DcIni signal) 38 outputted from the CPU or the like as a trigger.

FIG. 11 shows a timing chart showing a DAC code, an ADC code, and an output of the comparator 28 (or 29) from the beginning to the end of the control performed by the counter control unit 30 (or 31) after the DcIni signal 38 is inputted.

The counter of the counter control unit 30 (or 31) is reset by the DcIni signal 38 and synchronized with a clock outputted from a clock generation unit 39. The counter is increased when an enable signal inputted into the counter control unit 30 (or 31) is "1" and is not increased when the enable signal is "0." The DAC 32 (or 33) outputs voltage V' in accordance with the counter value (DAC code) of the counter control unit 30 (or 31) and controls the voltage Vout.

The reference voltage code 26 (or 27) is same (same value) as the code outputted when the voltage Vref is inputted into the ADC 24 (or 25). The comparator 28 (or 29) compares the reference voltage code 26 (or 27) with the output code from the ADC 24 (or 25). Then, the comparator 28 (or 29) outputs "0" if the reference voltage code 26 (or 27) is smaller than or equal to the ADC code (reference voltage code≤ADC code) and "1" if the reference voltage code 26 (or 27) is larger than the ADC code (reference voltage code>ADC code).

The ADC code satisfies "ADC input voltage ≈ Vref" when the output of the comparator 28 (or 29) is changed from "1" to "0". Therefore, the DC offset is corrected by stopping the counter operation of the counter control unit 30 (or 31) when the output of the comparator 28 (or 29) is changed to "0."

A voltage control range of the DAC 32 (or 33) performing the correction of the DC offset is set to be wider than the possible voltage range of the DC offset, and the DAC 32 (or 33) has a higher resolution than the desired correction range. Further, the ADC 24 (or 25), which detects the correction of the DC offset, has a higher resolution than the desired correction range. The clock, which drives the counter control unit 30 (or 31), is operated at a frequency lower than the settling time of step response between the DAC 32 (or 33) and the ADC 24 (or 25).

In the method of correcting a DC offset described in Japanese Patent Application Publication H10-013482, since noises are included in the output voltage of the operational amplifier at the output port of the DC offset correction circuit, the receiver sensitivity is degraded. In addition, since the operation of correcting the DC offset is required to be processed at a high speed, there is required a control unit capable of correcting the DC offset at a high speed.

SUMMARY OF THE INVENTION

In view of the above, the present invention provides a wireless receiver capable of preventing a degradation of a receiver sensitivity and correcting a DC offset at a high speed.

In accordance with an aspect of the present invention, there is provided a direct-conversion type wireless receiver, including: a pair of mixers configured to frequency-convert a radio signal received from an antenna into base band signals by a local signal having different phases; a first amplification circuit configured to amplify a base band signal from one of the mixers up to a demodulation level; a second amplification circuit provided between said one of the mixers and the first amplification circuit; a variable current circuit including a multi-stage current mirror to add a current $2^n$ times as high as a reference current; a control unit configured to correct a DC offset of said one of the mixers by allowing a current to flow into the second amplification circuit from the variable current circuit, based on an output of the first amplification circuit; and a capacitor connected between a gate and a source of a PchMOSFET which allows the reference current to flow therethrough.

With such configuration, the PchMOSFET, which determines the reference current, operates as a low noise current source by providing the capacitor between the gate and the source thereof and corrects a low noise DC offset by using the variable current circuit 68 or 69 having the multi-stage current mirror.

Further, the control unit may include a comparator configured to output a result of comparison between the output of the first amplification circuit and a predetermined reference voltage; a convergence determination circuit configured to determine whether or not the DC offset is within a predetermined convergence range; and a successive approximation register (SAR) configured to control the variable current circuit based on outputs of the convergence determination circuit and the comparator.

With such configuration, when the variable current circuit is controlled by the SAR, the DC offset can be corrected at a high speed. Further, an addition of noises to a reception input port can be reduced, and a degradation of receiver sensitivity can be prevented. Thus, a wireless receiver capable of correcting a DC offset at a high speed can be provided.

The wireless receiver described above may further include an inverter circuit provided between the control unit and the variable current circuit; and a first switch configured to select either a positive side output or a negative side output of the second amplification circuit and allow a current from the variable current circuit to flow therethrough.

With such configuration, the inverter circuit is provided at the output of the control unit to control the variable current circuit, so that no discontinuous point may be generated in the DC offset correction voltage, and the variable current circuit can be easily controlled.

In addition, the wireless receiver described above may further include a reference clock generation unit configured to generate a reference clock; dividers configured to divide the reference clock; and a second switch configured to select a clock, which determines an update timing of the SAR, among a plurality of clocks obtained by the dividers.

With such configuration, the clock frequency is varied, so that, even in a system provided with different filters, a clock frequency does not need to be tuned to a filter response time at which the settling time is maximized, and the DC offset correction can be performed at a high speed since an appropriate clock frequency can be prepared for the step response of each filter.

Further, the wireless receiver described above may further include a memory which stores convergence range setting values; and a third switch configured to select a convergence range setting value of the convergence determination circuit among the convergence range setting values.

With such configuration, the convergence range of the convergence determination circuit is varied, so that the DC offset correction appropriate to each system can be performed.

In accordance with the present invention, it is possible to provide a wireless receiver capable of preventing a degradation of a receiver sensitivity and correcting a DC offset at a high speed.

BRIEF DESCRIPTION OF THE DRAWINGS

The objects and features of the present invention will become apparent from the following description of embodiments, given in conjunction with the accompanying drawings, in which:

FIG. 6 shows a table of truth values of a second comparator, a third comparator and an EX-OR circuit;

FIGS. 7A and 7B show a timing chart related to the operation of a SAR;

FIG. 11 shows a timing chart of a DC offset control.

DETAILED DESCRIPTION OF THE EMBODIMENTS

Hereinafter, an embodiment of the present invention will be described in detail with reference to the accompanying drawings which form a part hereof.

(First Embodiment)

Figure 1:
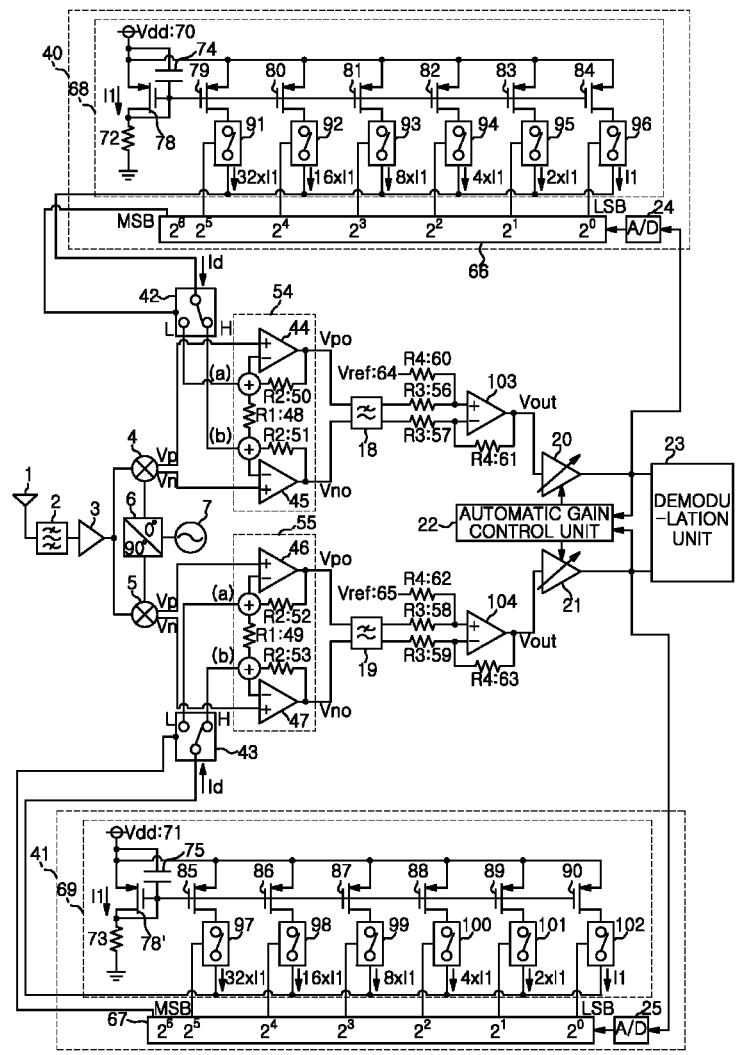
FIG. 1 shows a configuration of a wireless receiver in accordance with a first embodiment of the present invention.

FIG. 1 shows a configuration of a wireless receiver in accordance with a first embodiment of the present invention. The wireless receiver includes an antenna 1, a band pass filter 2, a low noise amplifier 3, mixers 4 and 5, a phase shifter 6, a local oscillator 7, DC offset correction circuits 40 and 41, positive-negative changeover switches (first switches) 42 and 43, differential amplifiers (first amplification circuits) 103 and 104, amplification circuits (second amplification circuits) 54 and 55, low pass filters 18 and 19, variable gain amplifiers 20 and 21, an automatic gain control unit 22, and a demodulation unit 23.

A desired radio frequency of a received signal through the antenna 1 only passes through the band pass filter 2. The received signal is amplified by the low noise amplifier 3 and is then inputted into the mixers 4 and 5. The phase shifter 6 and the local oscillator 7 are provided between the mixers 4 and 5, and the received signal is converted into I-phase and Q-phase base band signals having a phase difference of 90 degrees by a local signal of the local oscillator 7.

After the base band signals are amplified by the respective amplification circuits 54 and 55, a reception channel frequency is selected through the low pass filters 18 and 19 provided in the next stage thereof. Thereafter, outputs of the low pass filters 18 and 19 become single end outputs of the differential amplifiers 103 and 104, respectively. Further, the outputs are adjusted in gain by the automatic gain control unit 22 and the variable gain amplifiers 20 and 21 and are then inputted into the demodulation unit 23 and the automatic gain control unit 22.

Since the base band signals of the input signals supplied to the demodulation unit 23 and the automatic gain control unit 22 include the DC offsets generated by the mixers 4 and 5 and the amplification circuits 54 and 55, the DC offset correction circuit 40 of the I phase and the DC offset correction circuit 41 of the Q phase are provided in order to correct the DC offsets.

Next, there will be described a method of correcting the DC offsets generated by the mixers 4 and 5.

In the case of the I phase signal, the output signal of the mixer 4 is amplified by the amplification circuit 54 which includes differential amplifiers 44 and 45, a resistor (R1) 48, and resistors (R2) 50 and 51. The amplified signal passes through the low pass filter 18 and is outputted as a differential signal. The differential signal of the input signals is amplified by the reference voltage Vref 64, resistors (R3) 56 and 57, resistors (R4) 60 and 61, and the differential amplifier 103. Thus, a single-end output can be obtained by using the reference voltage Vref 64 as a bias voltage. The single-end output signal passes through the variable gain amplifier 20, and the DC voltage is digitized by an ADC 24. Then, a control unit 66 of the DC offset correction circuit 40 controls drain current control switches 91 to 96 in a variable current circuit 68 and the positive-negative changeover switch 42 such that the input voltage of the ADC 24 becomes a target voltage.

In the same manner, for the Q phase signal, a single-end output can be obtained through the mixer 5, the amplification circuit 55, the low pass filter 19 and the differential amplifier 104, and the variable gain amplifier 21, and the DC voltage is digitized by an ADC 25. A control unit 67 of the DC offset correction circuit 41 controls drain current control switches 97 to 102 in a variable current circuit 69 and the positive-negative changeover switch 43 such that the input voltage of the ADC 25 becomes a target voltage.

As shown in FIG. 1, if a current Id is made to flow into (a) of the amplification circuit 54 (or 55) by using the differential voltages Vp and Vn of the mixer 4 (or 5), output port voltages Vpo and Vno becomes biased as shown below. In addition, the resistors (R2) 50, 51, 52 and 53 have the same resistance value in order to improve input and output differential characteristics. Further, the gain of the amplification circuit 54 (or 55) is expressed as a ratio of the resistors (R2) 50 and 51 to the resistor (R1) 48 (or the resistors (R2) 52 and 53 to the resistor (R1) 49).

$$Vpo=Vp+(R2/R1)(Vp-Vn)-R2 \cdot Id$$

$$Vno=Vn-(R2/R1)(Vp-Vn)$$

The differential output voltage is converted into a single-end signal by the corresponding differential amplifier 103 (or 104) while the reference voltage Vref 64 (or 65) is used as a bias voltage. Accordingly, Vout can be expressed as the following equation (1):

$$Vout = (R4/R3)(Vpo - Vno) + Vref \qquad (1)$$
$$= (R4/R3)[(1 + 2 \cdot R2/R1)(Vp - Vn) - R2 \cdot Id] + Vref.$$

In a similar manner, if the current Id is made to flow into (b) of the amplification circuit 54 (or 55), output port voltages Vpo and Vno are biased as shown below:

$$Vpo=Vp-(R2/R1)(Vn-Vp)$$

$$Vno=Vn+(R2/R1)(Vn-Vp)-R2 \cdot Id.$$

Accordingly, Vout can be expressed as the following equation (2):

$$Vout = (R4/R3)(Vpo - Vno) + Vref \qquad (2)$$
$$= (R4/R3)[(1 + 2 \cdot R2/R1)(Vp - Vn) + R2 \cdot Id] + Vref.$$

Here, if the DC offset generated by the mixer 4 (or 5) is α and the mixer 4 (or 5) outputs nothing but a DC offset component, it satisfies α=(Vp−Vn). Thus, if a value calculated in the square brackets [ ] of equation (1) or (2) is 0, it satisfies Vout=Vref, and thus, the DC offset correction is completed.

In addition, the DC offset can be corrected by allowing current to flow into (a) if α is a positive value or by allowing current to flow into (b) if α is a negative value.

In regard to the magnitude of the current Id, the drain current Il, which is determined by a power supply Vdd 70 (or 71) and a resistor 72 (or 73) of a current mirror, is used as a reference current. The current mirror generates a current $2^n$ times (n=0, 1, 2, 3, 4, 5) as high as the reference current, and an addition of each current can be performed by the drain current control switches 91 to 96 (or 97 to 102).

Next, the sequence of correcting the DC offset will be described. In a state where the antenna 1 is terminated with 50Ω, the DC offset generated by the amplification circuit 54

(or 55) and a self mixing of the mixer 4 (or 5) is amplified by the differential amplifier 103 (or 104) positioned in the next stage thereof. Further, the DC offset is amplified by the variable amplifier 20 (or 21), which is fixed at a maximum gain and is then inputted into the demodulation unit 23. The input voltage of the demodulation unit 23 is also inputted into the control unit 66 (or 67) through the ADC 24 (or 25). The control unit 66 (or 67) controls the drain current switches 91 to 96 (or 97 to 102), which are the multi-stage current mirror, and the positive-negative changeover switch 42 (or 43), which switches the connection between (a) and (b) of the amplification circuit 54 (or 55). Accordingly, the control code is outputted from the control unit 66 (or 67) by making Vout equal to Vref based on the output value of the ADC 24 (or 25).

In addition, a capacitor 74 (or 75) is connected between the gate and the source of a PchMOSFET (P-channel type Metal-Oxide-Semiconductor Field-Effect Transistor) 78 (or 78') which allows the reference current I1 to flow into the variable current circuit 68 (or 69). Therefore, it becomes possible to reduce a noise of the reference current I1 and perform a low noise DC offset correction. Since the noise generated in the reference current is reduced by the capacitor 74 (or 75), the noise generated in the current mirror is also reduced. Further, since the low noise variable current circuit 68 (or 69) is used to control the amplification circuit 54 (or 55), the output noise can also be reduced.

(Second Embodiment)

Figure 2:
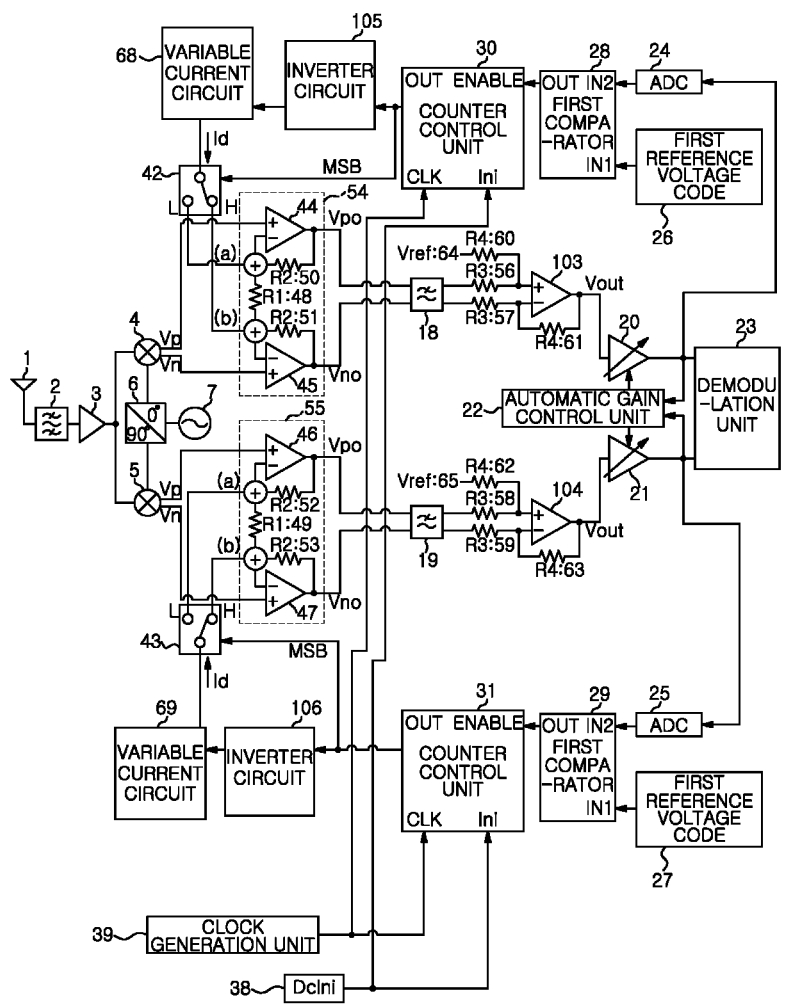
FIG. 2 shows a configuration of a wireless receiver in accordance with a second embodiment of the present invention.

FIG. 2 shows a configuration of a wireless receiver in accordance with a second embodiment of the present invention. In the second embodiment, inverter circuits 105 and 106 are respectively provided at the outputs of the control units 66 and 67 shown in FIG. 1. In FIG. 2, the control unit 66 (or 67) is configured to include a first reference voltage code (reference voltage code) 26 (or 27), a counter control unit 30 (or 31), a first comparator (comparator) 28 (or 29), a DcLni signal 38, and a clock generation unit 39.

Figure 3A:
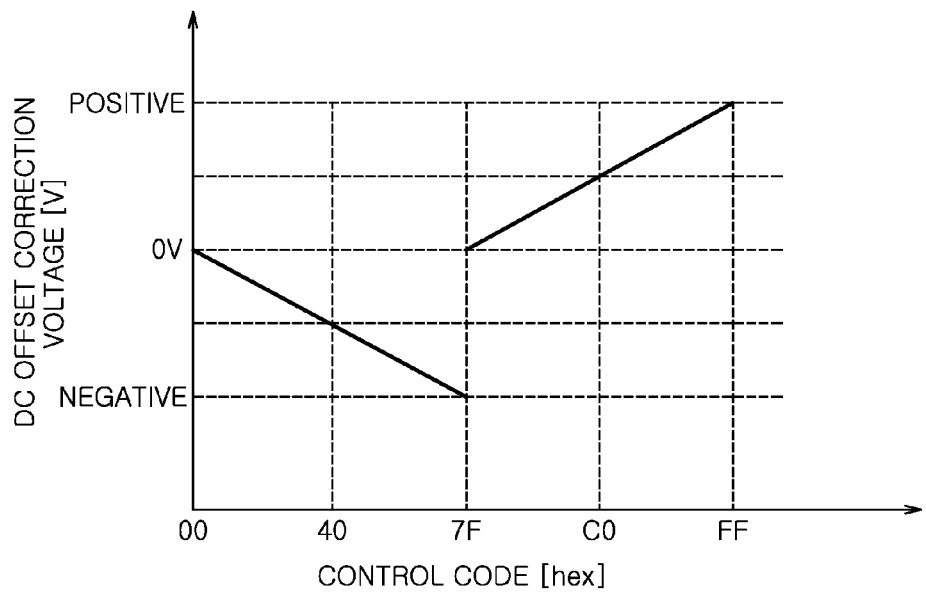
FIGS. 3A and 3B show the relationship between a control code and a DC offset correction voltage of an output of a differential amplifier.

FIG. 3A shows a relationship between a DC offset correction voltage of the output of the differential amplifier 103 (or 104) and the control code in accordance with the first embodiment. The current output from the variable current circuit 68 (or 69) is linearly changed in proportion to the control code inputted into the variable current circuit 68 (or 69) since the current of each component is $2^n$ times as high as the reference current. In the first embodiment, when the variable current circuit 68 (or 69) and the positive-negative changeover switch 42 (or 43) are controlled by using the control code outputted from the control unit 66 (or 67), the DC offset correction voltage of the output of the differential amplifier 103 (or 104) becomes as shown in FIG. 3A. That is, a discontinuous point is generated in the DC offset correction voltage at a time when an MSB (Most Significant Bit) of the control code is changed from 0 to 1, so that the variable current circuit 68 (or 69) cannot be easily controlled.

Figure 4A:
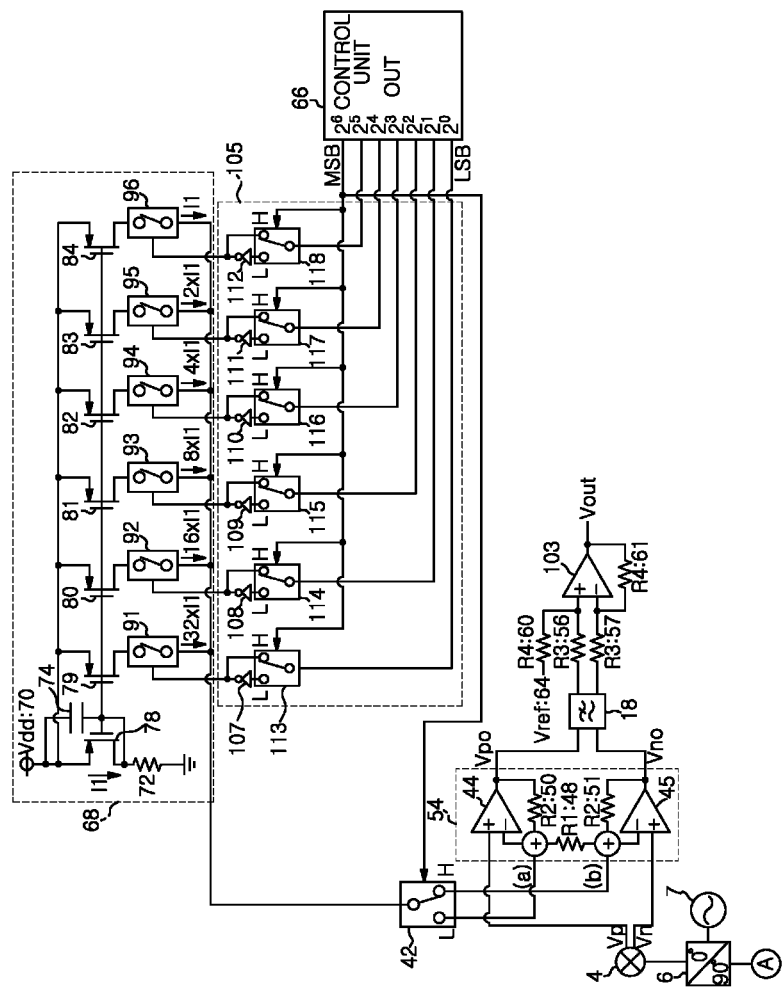
FIGS. 4A and 4B show a circuit diagram showing a connection of an inverter circuit.
Figure 4B:
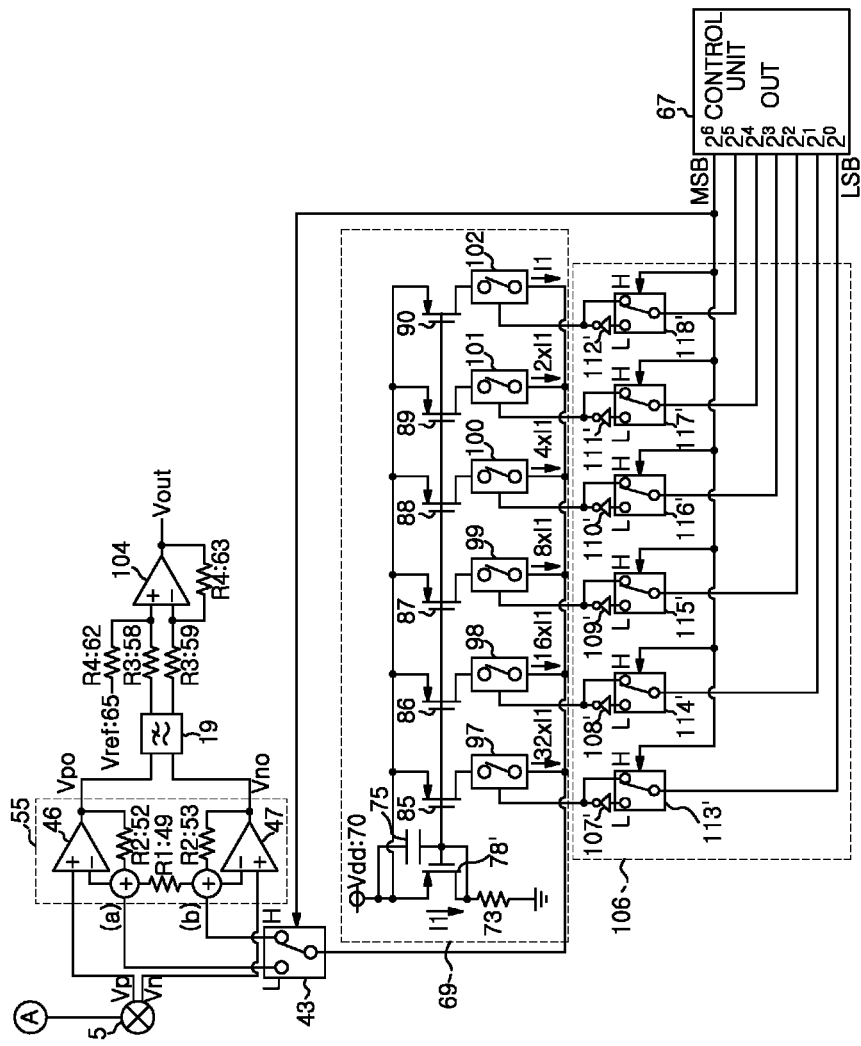

FIGS. 4A and 4B show a circuit diagram showing a connection of the inverter circuit. Input signals of the drain current control switches 91 to 96 (or 97 to 102), each of which allows a current $2^n$ times as high as the reference current of the variable current circuit 68 (or 69) to flow therethrough, are inputted after being inverted depending on the control code MSB from inverter changeover switches 113 to 118 (or 113' to 118'), which are respectively connected to inverters 107 to 112 (or 107' to 112').

In regard to the control of the inverter changeover switches 113 to 118 (or 113' to 118'), when the MSB of the control code is "0," the input signals are inverted by the respective inverters 107 to 112 (or 107' to 112') and the inverted input signals are inputted to the drain current control switches 91 to 96 (or 97 to 102). In contrast, when the MSB of the control code is "1," the non-inverted input signals are inputted to the drain current control switches 91 to 96 (or 97 to 102).

Figure 3B:
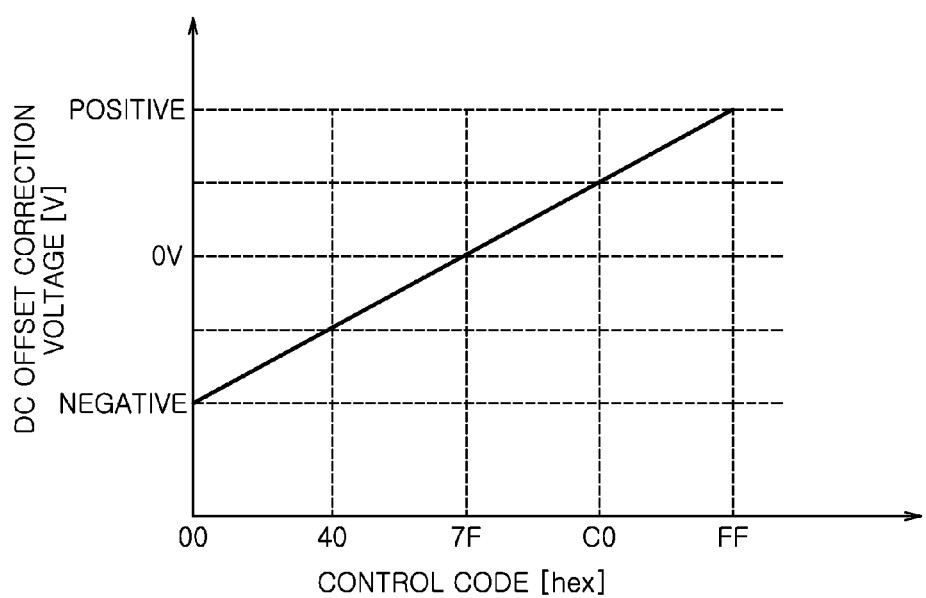

As shown in FIGS. 4A and 4B, by providing the inverter circuit 105 (or 106) at the output of the control unit 66 (or 67) to control the variable current circuit 68 (or 69), no discontinuous point is generated in the DC offset correction voltage as shown in FIG. 3B, and the control of the variable current circuit 68 (or 69) can be easily performed.

In addition, as shown in FIG. 2, by providing the inverter circuit 105 (or 106), it becomes possible to control the DC offset correction by using the counter control unit 30 (or 31) described in the conventional case.

(Third Embodiment)

Figure 5A:
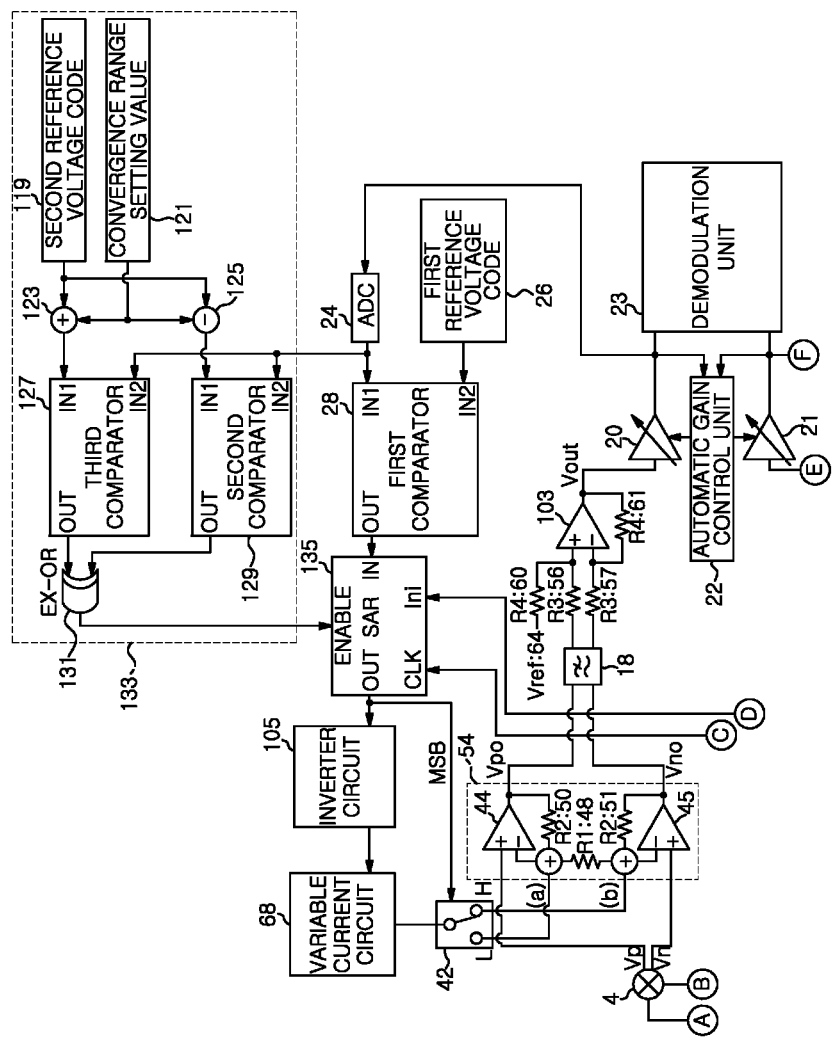
FIGS. 5A and 5B show a configuration of a wireless receiver in accordance with a third embodiment of the present invention.
Figure 5B:
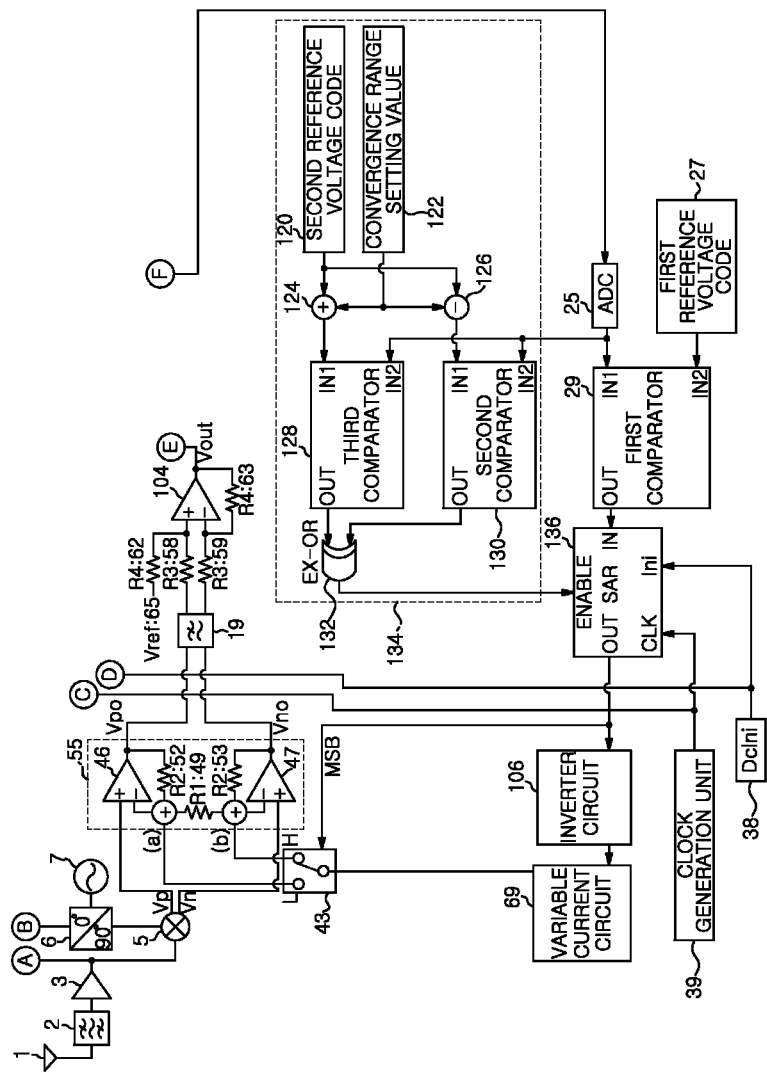

FIGS. 5A and 5B show a configuration of a wireless receiver in accordance with a third embodiment of the present invention. In the conventional case, since the DC offset correction is performed by increasing the counter value by the counter control unit, the control termination time of the DC offset correction control depends on the amount of the generated DC offset, and it may be time-consuming to correct the DC offset depending on the amount of the generated DC offset. Therefore, in the third embodiment, Successive Approximation Registers (SARs) 135 and 136 respectively control the variable current circuits 68 and 69, so that the DC offset correction can be performed at a high speed.

In FIGS. 5A and 5B, the control unit 66 (or 67) of the first embodiment is configured to include a first reference voltage code 26 (or 27), a first comparator 28 (or 29), a convergence determination unit 133 (or 134), an SAR 135 (or 136), a DcIni signal 38, and a clock generation unit 39. The convergence determination unit 133 (or 134) has a second reference voltage code 119 (or 120), a convergence range setting value 121 (or 122), an adder 123 (or 124), a subtractor 125 (or 126), a second comparator 129 (or 130), a third comparator 127 (or 128), and an EX-OR circuit (convergence determination circuit) 131 (or 132).

Hereinafter, the operation of each block of the wireless receiver in accordance with the third embodiment will be described. FIG. 6 is a table showing truth values of the second comparator, the third comparator, and the EX-OR circuit.

The second comparator 129 (or 130) compares the "ADC code" with "the second reference voltage code 119 (or 120)–the convergence range setting value 121 (or 122)," wherein the second reference voltage code 119 (or 120) is used as a reference voltage code that is compared with the ADC code when using the second comparator 129 (or 130) and the third comparator 127 (or 128). The second comparator 129 (or 130) outputs "0" as a comparison result if "ADC code" is larger than or equal to "the second reference voltage code 119 (or 120)–the convergence range setting value 121 (or 122)" (i.e., ADC code≥second reference voltage code–convergence range setting value) and outputs "1" as a comparison result if "ADC code" is smaller than "the second reference voltage code 119 (or 120)–the convergence range setting value 121 (or 122)" (i.e., ADC code<second reference code–convergence range setting value).

The third comparator 127 (or 128) compares the "ADC code" with "the second reference voltage code 119 (or 120)+ the convergence range setting value 121 (or 122)." The third comparator 127 (or 128) outputs "1" as a comparison result if the "ADC code" is larger than "the second reference voltage code 119 (or 120)+the convergence range setting value 121 (or 122)" (i.e., ADC code>second reference voltage code+ convergence range setting value) and outputs "0" as a comparison result if "ADC code" is smaller than or equal to "the second reference voltage code 119 (or 120)+the convergence range setting value 121 (or 122)" (i.e., ADC code≤second reference voltage code+convergence range setting value).

That is, the convergence determination unit 133 (or 134) outputs "0" as a comparison result if the DC offset is corrected within a desired DC offset correction range and outputs "1" as a comparison result if the DC offset is corrected out of range.

Meanwhile, the first comparator 28 (or 29) compares the ADC code with the first reference voltage code 26 (or 27), and outputs "1" as a comparison result if the "ADC code" is larger than "the first reference voltage code 26 (or 27)" (i.e., ADC code>first reference voltage code) and outputs "0" if the "ADC code" is smaller than or equal to "the first reference voltage code 26 (or 27)" (i.e., ADC code≤first reference voltage code).

FIGS. 7A and 7B show the operation of the SAR when the variable current circuit 68 (or 69) and the positive-negative changeover switch 42 (or 43) are controlled by using 7 bits. If an output of the SAR is a control code DACI of 7 bits, the SAR 135 (or 136) receives the DcIni signal 38 and outputs as an initial value "DACI=40 [hex]" (MSB(DACI(6))="1," (DACI (5) to DACI(0))="0" other than the MSB), which is an intermediate value of the control code.

When the next clock is inputted, a comparison result of the first comparator 28 (or 29) is determined, and "0" is outputted to the MSB as a determination (determination (1)) if the comparison result is "1" and "1" is outputted to the MSB if the comparison result is "0." Median (DACI(5) to DACI(0)=20 [hex]) of the control code corresponding to the lower bits except the MSB (determined bit) are outputted together with the output of the determination (determination (1)).

The output of the determination and the output of the median of the control code corresponding to the bits lower than the determined bit are sequentially repeated until the LSB is determined (determination (7)). In this manner, the control code is set until the ADC code is equal to the first reference voltage code 26 (or 27).

However, when "0" is inputted as an enable signal, it is determined that the DC offset is corrected within the desired correction range, and the output of the determination is not performed. Then, the previous control code is maintained and the operation of the SAR is stopped.

FIG. 7A shows a timing chart when the DC offset is out of the convergence range and FIG. 7B shows a timing chart when the DC offset is within the convergence range. In FIG. 7B, it is determined that the DC offset is within the convergence range after the determination (3) is outputted, so that the enable signal is changed to "0," and the operation of the SAR 135 (or 136) is stopped.

In the third embodiment described above, the DC offset can be corrected at a high speed merely by performing seven determinations in the case of using the 7 bit SAR.

Further, if the DC offset correction voltage is controlled at the positive side thereof (i.e., the DC offset correction voltage has only positive values all the time) in the third embodiment, the DC offset correction can be controlled by using the SAR 135 (or 136) by connecting the output of the variable current circuit 68 (or 69) to (b) of the amplification circuit 54 (or 55), without using the inverter circuit 105 (or 106) and the positive-negative changeover switch 42 (or 43).

The above described case corresponds to, for example, a case where the DC offset of the mixer 4 (or 5) is generated only at the negative side, or "Vref−ΔVoffset" is supplied as a bias voltage of the differential amplifier 103 (or 104), wherein ΔVoffset voltage is a voltage component added to Vout due to the maximum DC offset voltage that can be generated by the mixer 4 (or 5).

If the DC offset correction voltage is controlled at the negative side thereof (i.e., the DC offset correction voltage has only negative values all the time), the DC offset correction can be controlled by using the SAR 135 (or 136) by connecting the output of the variable current circuit 68 (or 69) to (a) of the amplification circuit 54 (or 55) and inverting the determination result of the SAR 135 (or 136), without using the inverter circuit 105 (or 106) and the positive-negative changeover switch 42 (or 43).

(Fourth Embodiment)

Figure 8A:
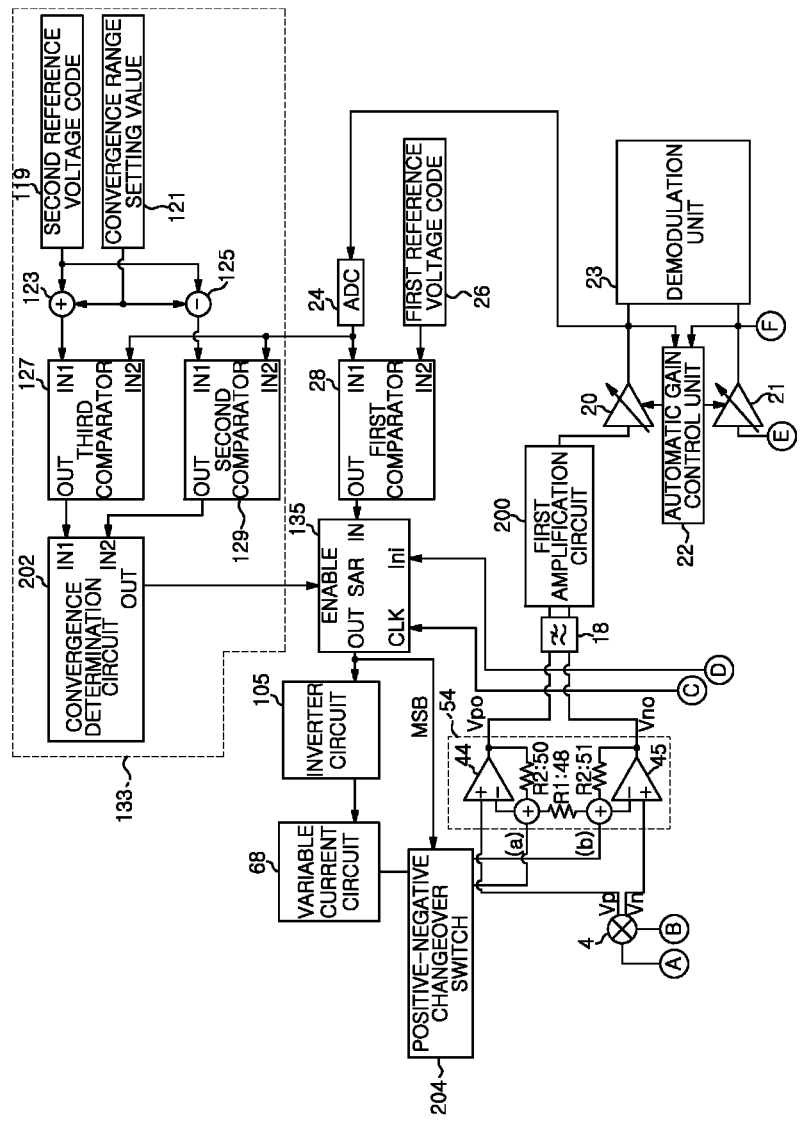
FIGS. 8A and 8B show a configuration of a wireless receiver in accordance with a fourth embodiment of the present invention.
Figure 8B:
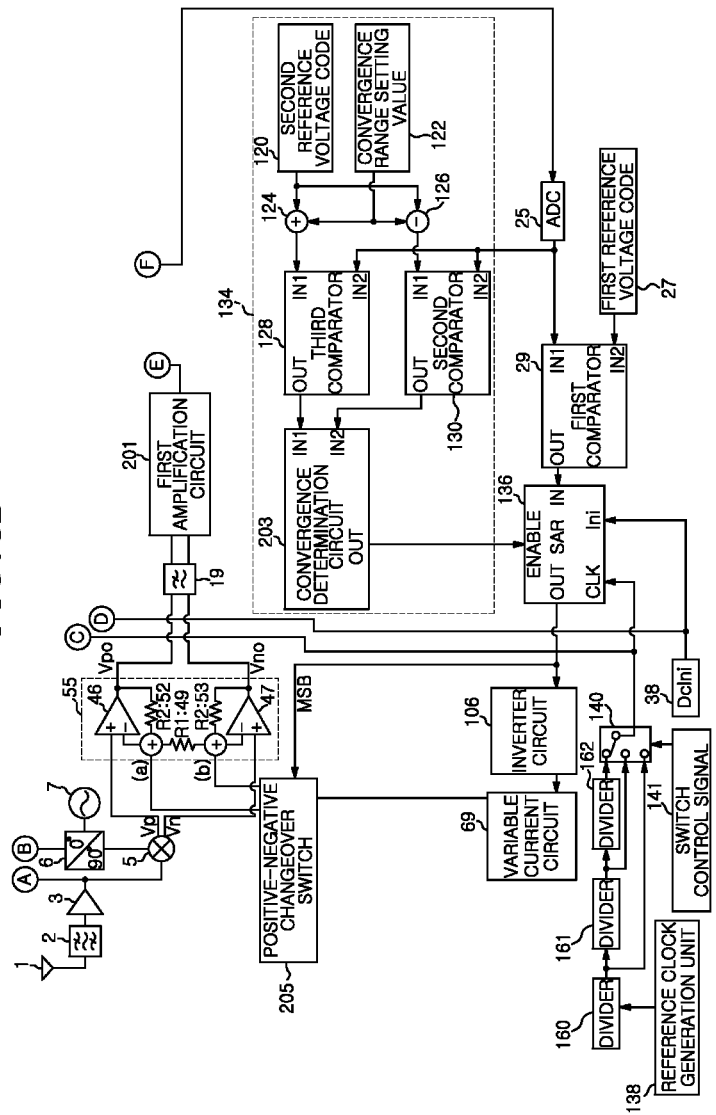

FIGS. 8A and 8B show a configuration of a wireless receiver in accordance with a fourth embodiment of the present invention. In the fourth embodiment, the clock generation unit 39 shown in FIGS. 5A and 5B is configured to include a reference clock generation unit 138, dividers 160 to 162, a second switch 140, and a switch control signal 141.

In comparison with the configuration of the third embodiment, the reference clock generated by the reference clock generation unit 138 is divided by, e.g., 1/n (e.g., 'n' is even number) by each of the dividers 160 to 162. Therefore, it is possible to select one clock among a plurality of clocks.

In contrast to above, if there is only one reference clock in a system including filters for different frequency bandwidths, the clock frequency needs to be tuned to a filter having a maximum settling time of the step response characteristics among the prepared filters. For that reason, the same clock may be used for the filters having a fast settling time of the step response characteristics, and thus the DC offset correction cannot be performed at a high speed.

In accordance with the fourth embodiment, even in the system preparing filters having different frequency bandwidths, it is not necessary that the clock frequency is tuned to a filter having the maximum settling time. Further, since an appropriate clock frequency can be prepared for the step response of each filter, the DC offset correction can be performed at a high speed.

(Fifth Embodiment)

Figure 9A:
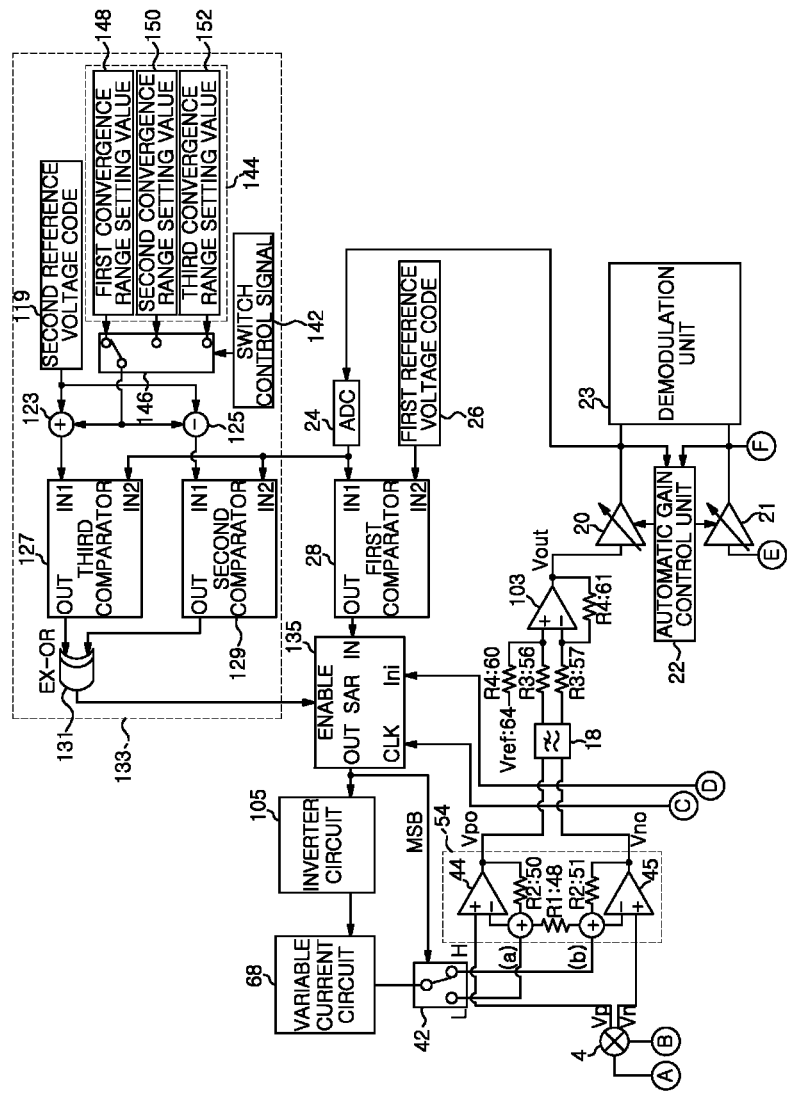
FIGS. 9A and 9B show a configuration of a wireless receiver in accordance with a fifth embodiment of the present invention.
Figure 9B:
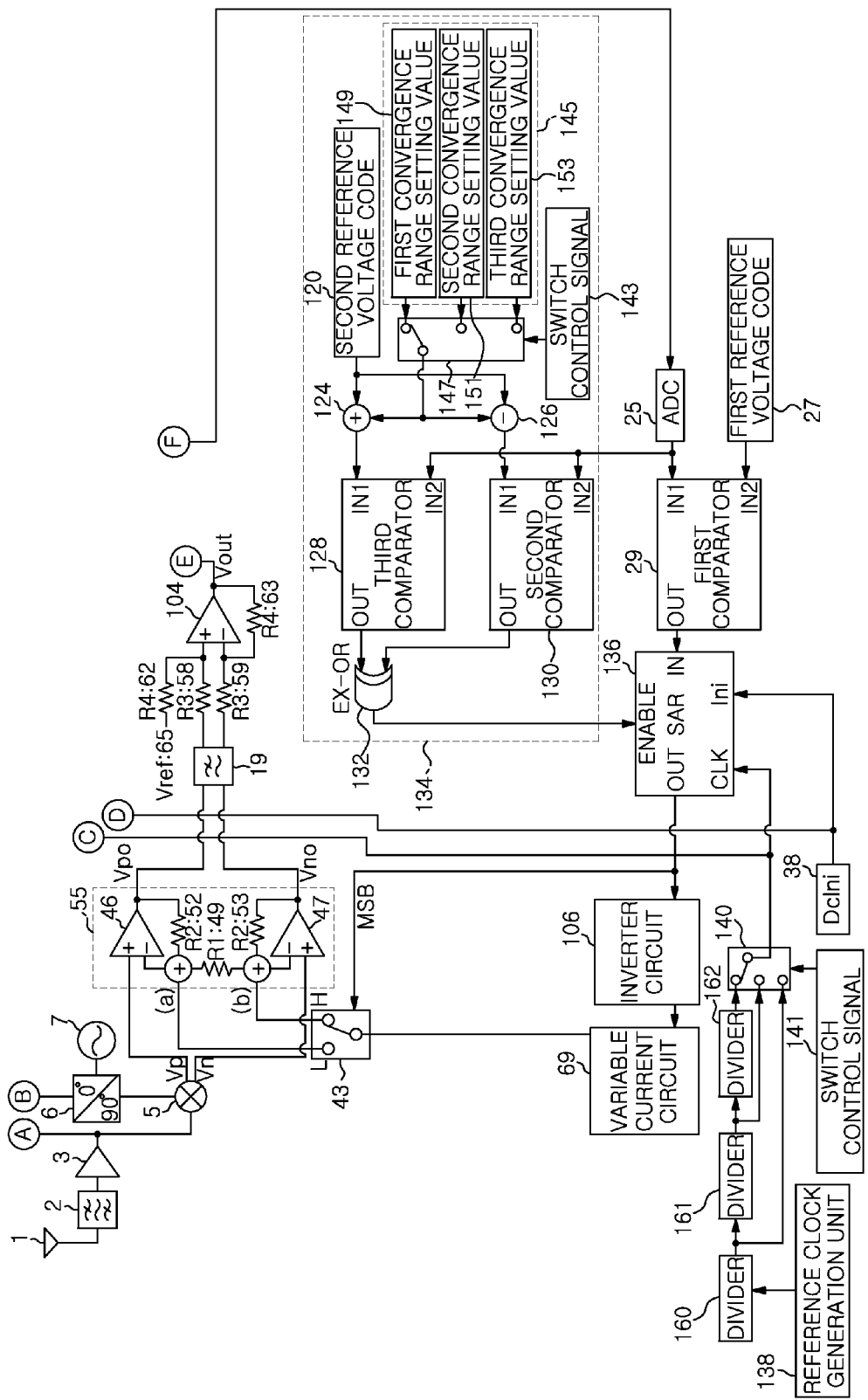
Figure 10:
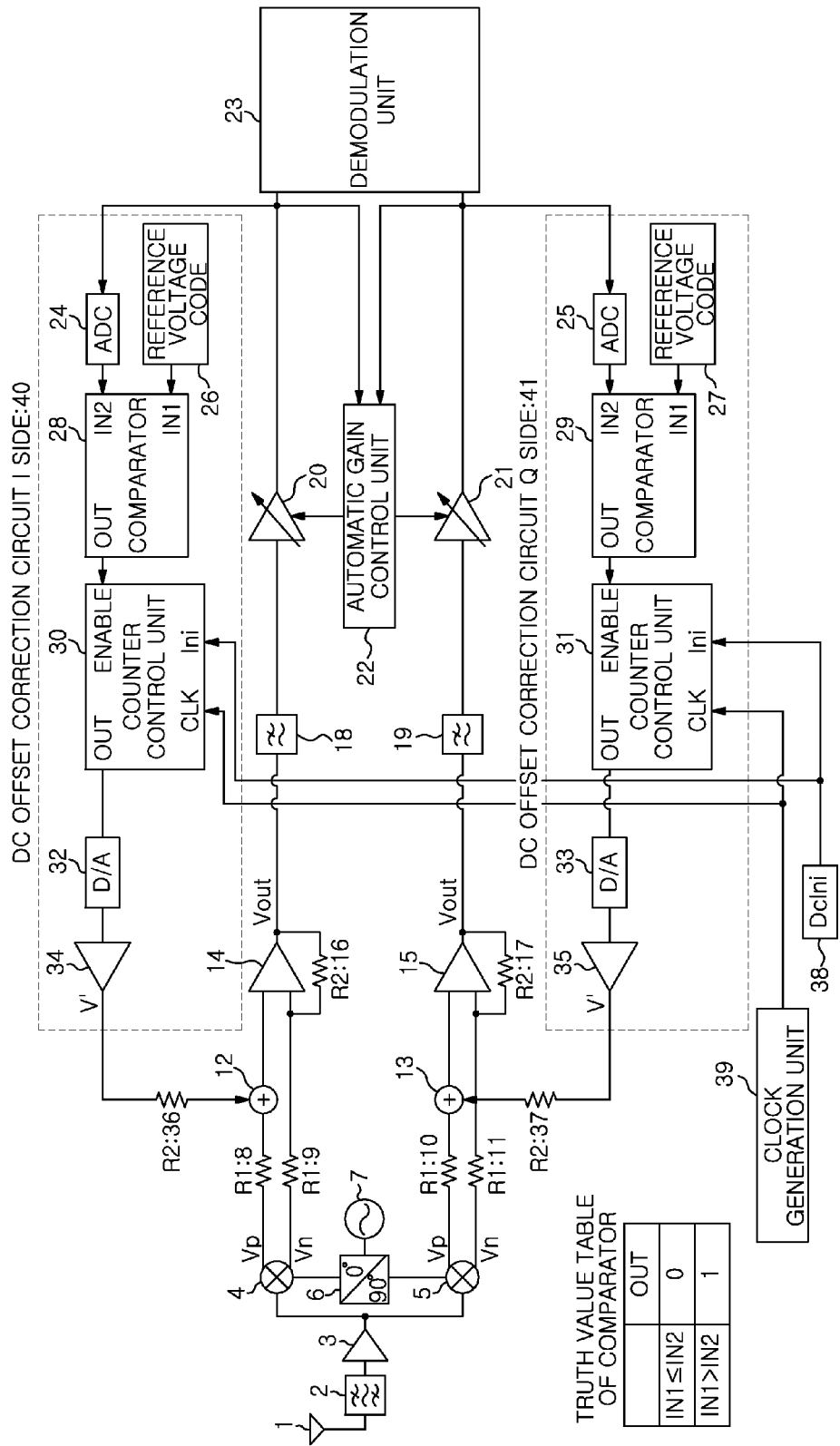
FIG. 10 is a block diagram of a conventional direct-conversion receiver.

FIGS. 9A and 9B show a configuration of a wireless receiver in accordance with a fifth embodiment of the present invention. The wireless receiver has switch control signals 142 and 143, memories 144 and 145 and third switches 146 and 147, instead of the convergence range setting values 121 and 122 shown in FIGS. 5A and 5B. For example, the memories 144 and 145 respectively store in advance, first convergence range setting values 148 and 149, second convergence range setting values 150 and 151, and third convergence range setting values 152 and 153.

In comparison with the configuration of the third embodiment, the first convergence range setting value 148 (or 149), the second convergence range setting value 150 (or 151), and the third convergence range setting value 152 (or 153) are stored in the memory 144 (or 145), and a convergence determination range can be selected by the third switch 146 (or 147) based on the switch control signal 142 (or 143).

By varying the convergence range as described above, the appropriate DC offset corrections can be performed for each system.

In addition, the present invention is not limited to the aforementioned embodiments, but various modifications can be made thereto within the scope of the invention without departing from the essential features of the invention when implementing the present invention. Further, various embodiments can be implemented by suitably combining the components disclosed in the aforementioned embodiments. For example, some of the entire components of the embodiment may be omitted. Further, some components of another embodiment may be suitably combined.

While the invention has been shown and described with respect to the embodiments, it will be understood by those skilled in the art that various changes and modifications may be made without departing from the scope of the invention as defined in the following claims.

What is claimed is:

1. A direct-conversion type wireless receiver, comprising:
a pair of mixers configured to frequency-convert a radio signal received from an antenna into base band signals by local signals having different phases;
a first amplification circuit configured to amplify a base band signal from one of the mixers up to a demodulation level;
a second amplification circuit provided between said one of the mixers and the first amplification circuit;
a variable current circuit including a multi-stage current mirror to add a current $2^n$ times as high as a reference current, wherein n is an integer equal to or greater than zero;
a control unit configured to correct a DC offset of said one of the mixers by allowing a current to flow into the second amplification circuit from the variable current circuit, based on an output of the first amplification circuit; and
a capacitor connected between a gate and a source of a PchMOSFET which allows the reference current to flow therethrough.

2. The wireless receiver of claim 1, wherein the control unit includes a comparator configured to output a result of comparison between the output of the first amplification circuit and a predetermined reference voltage; a convergence determination circuit configured to determine whether or not the DC offset is within a predetermined convergence range; and a successive approximation register (SAR) configured to control the variable current circuit based on outputs of the convergence determination circuit and the comparator.

3. The wireless receiver of claim 2, further comprising an inverter circuit provided between the control unit and the variable current circuit; and a first switch configured to select either a positive side output or a negative side output of the second amplification circuit and allow a current from the variable current circuit to flow therethrough.

4. The wireless receiver of claim 2, further comprising a reference clock generation unit configured to generate a reference clock; dividers configured to divide the reference clock; and a second switch configured to select a clock, which determines an update timing of the SAR, among a plurality of clocks obtained by the dividers.

5. The wireless receiver of claim 2, further comprising a memory which stores convergence range setting values; and a third switch configured to select a convergence range setting value of the convergence determination circuit among the convergence range setting values.

6. The wireless receiver of claim 1, further comprising an inverter circuit provided between the control unit and the variable current circuit; and a first switch configured to select either a positive side output or a negative side output of the second amplification circuit and allow a current from the variable current circuit to flow therethrough.

* * * * *